Figure 1:
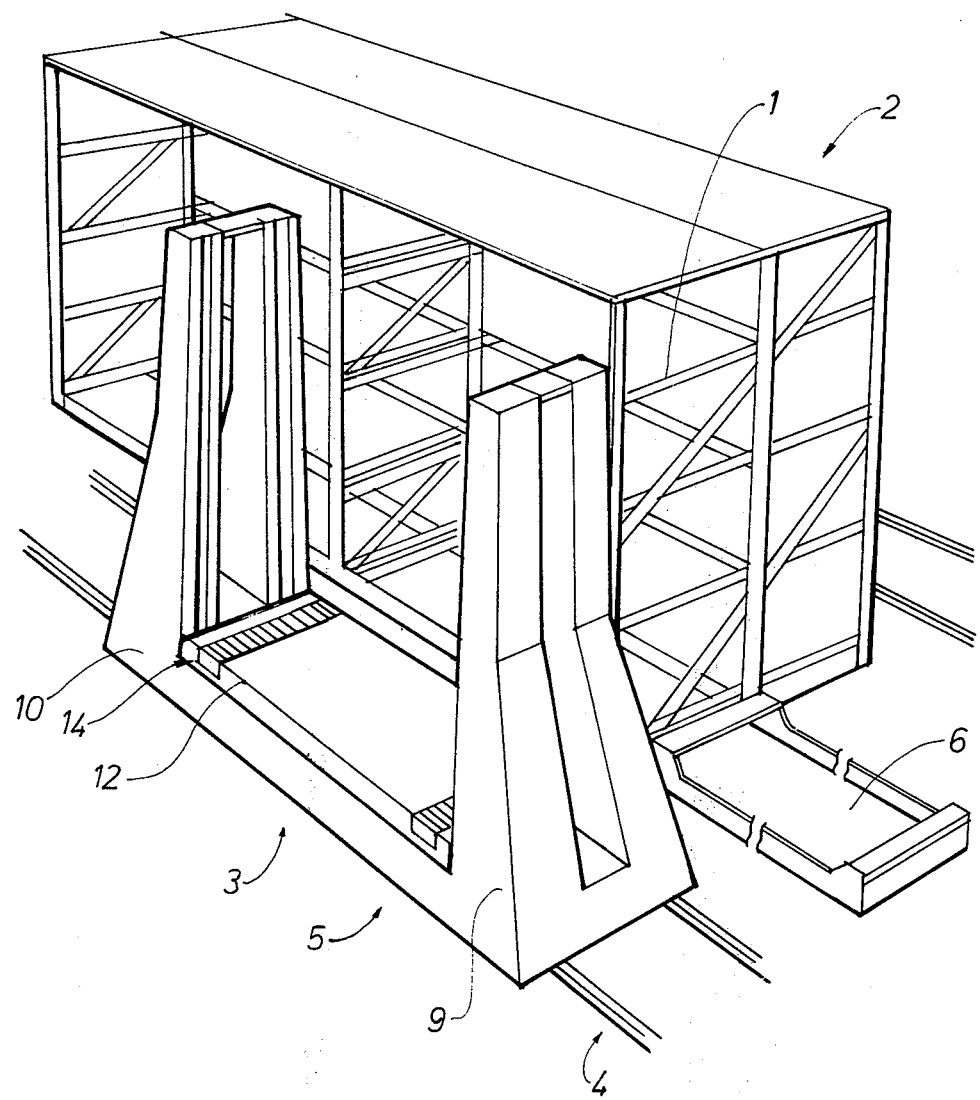

United States Patent [19]

Anderson

[11] 4,010,856
[45] Mar. 8, 1977

[54] STORAGE APPARATUS WITH SLIDE ASSEMBLIES AND A TRANSPORTATION DEVICE WITH PIVOTAL CONVEYOR MEANS

[76] Inventor: Leif Per Roland Anderson, Bogatan 39 A, 412 72 Goteborg, Sweden

[22] Filed: May 27, 1975

[21] Appl. No.: 580,699

[52] U.S. Cl. .................. 214/16.4 A; 214/16.1 CE
[51] Int. Cl.² .......................................... E04H 6/06
[58] Field of Search ................ 214/16.4 A, 16.4 R, 214/16 B, 16.1 C, 16.1 CC, 16.1 LE, 16.1 CE, 16.1 DB, 730

[56] References Cited

UNITED STATES PATENTS

| 3,075,659 | 1/1963 | Sylvester et al. | 214/730 |
|---|---|---|---|
| 3,079,015 | 2/1963 | Sinclair et al. | 214/16.1 CE |
| 3,292,804 | 12/1966 | Veneman | 214/730 |
| 3,455,469 | 7/1969 | Evans | 214/16.4 A |
| 3,630,319 | 12/1971 | Peterson et al. | 214/730 X |
| 3,782,563 | 1/1974 | Brockmeyer et al. | 214/730 X |
| 3,809,259 | 5/1974 | Pipes | 214/16.4 A |
| 3,883,008 | 5/1975 | Castaldi | 214/16.4 A |

Primary Examiner—L. J. Paperner
Assistant Examiner—R. B. Johnson

[57] ABSTRACT

A horizontally movable load transportation device is equipped with a vertically movable elevator. The elevator has a pivotally mounted conveyor device that is adapted to engage an edge of a load and transfer it toward a selected storage compartment. The storage compartments have movable load engaging devices which are adapted to engage another edge of the load to assist in the transfer of the load between the transportation device and the storage compartment.

2 Claims, 10 Drawing Figures

U.S. Patent  Mar. 8, 1977  4,010,856

STORAGE APPARATUS WITH SLIDE ASSEMBLIES AND A TRANSPORTATION DEVICE WITH PIVOTAL CONVEYOR MEANS

BRIEF SUMMARY OF THE INVENTION

The present invention relates to an arrangement in connection with storage establishments for unit loads according to the preamble of claim 1.

In connection with the handling of unit loads as containers and pallet loads an in-between storage on certain occasions is required, where a great number of unit loads may have to be stored at the same time. By way of example this is the case in connection with the unloading of a ship, when a great number of unit loads are discharged from the ship at a quicker rate than what is possible to obtain in connection with their removal with road transportation means. In the same way an in-between storage successively shall be fed with all the unit loads required for loading a ship. A storage establishment for said purpose thus may require a capacity corresponding the loading capacity of one and perhaps several ships.

The simplest way to arrange the necessary storage facility consists in placing the unit loads on the ground, fork or straddle trucks being used for said purpose. Such a procedure, however, signifies a very poor utilization of the surface. If each unit load shall be directly accessible, the accommodation can only take place in one plane, and moreover a great distance has to be left open between the unit loads in order to permit the trucks to carry out the necessary transfer and turning movements. In order to obtain a better utilization of the surface, the construction of high rise warehouses in several stories has been proposed. The solutions, which hitherto have appeared, however, involve the drawback that the trucks or elevators, which must be used for the necessary service of the establishment, will be exposed to great tilting moments, when the sidewise displacement of the load into its storage compartment shall take place. This brings in its train a bulky as well as costly building design for the elevator means in question.

It is an object of the present invention to provide an arrangement in connection with storage establishments in several stories for unit loads, which arrangement permits the design of the necessary lifting means in such a manner that no consideration needs to be taken with respect to lateral forces, whereby advantages are obtained in the form of a reduction of the load and a reduction of the space required.

The object of the invention is reached by designing the arrangement in accordance with the characteristics specified in the first claim.

Figure 2:
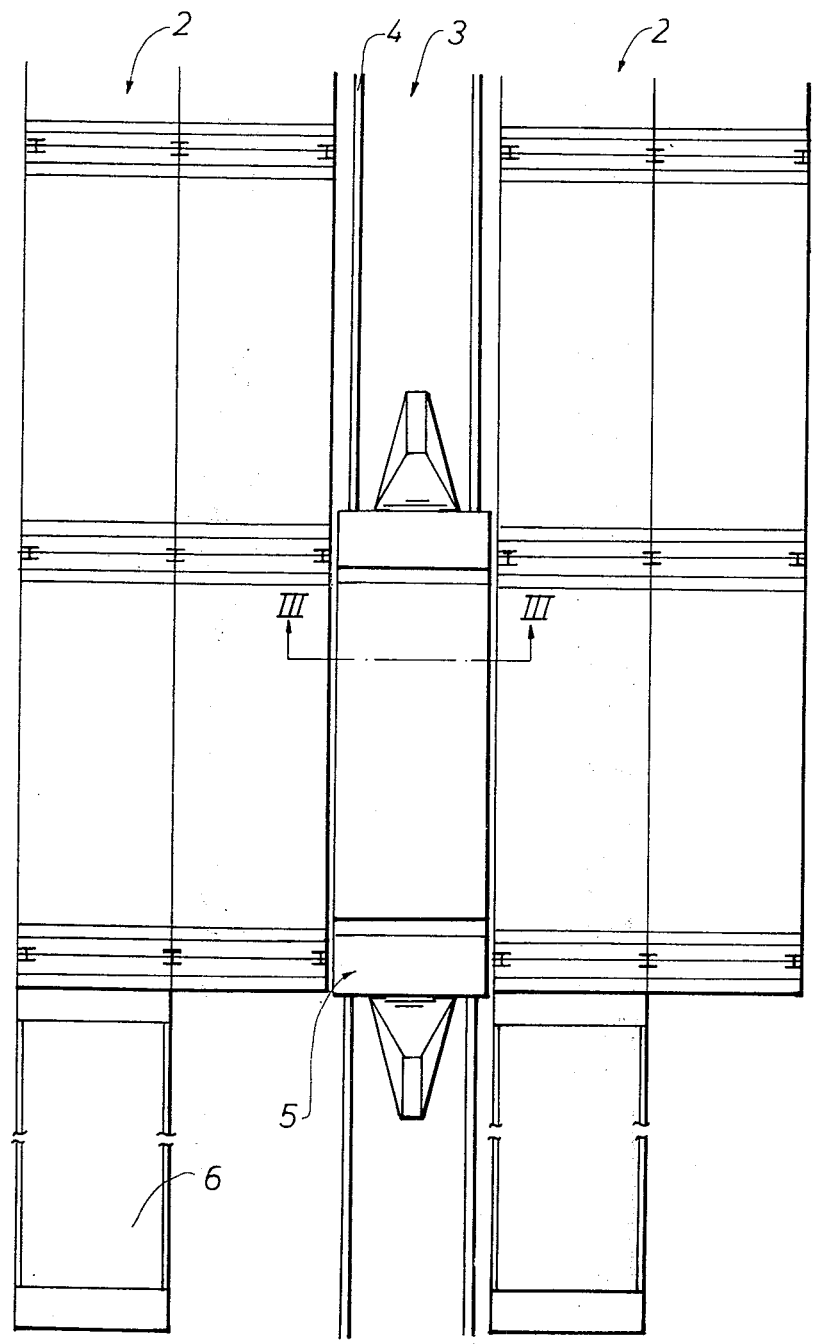
Figure 9:
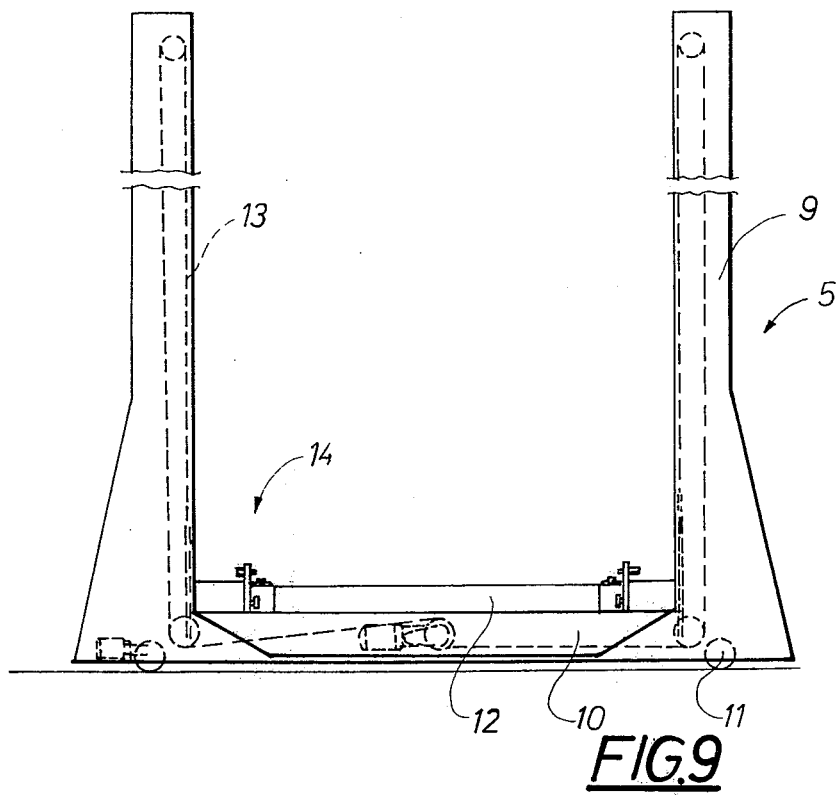
Figure 10:
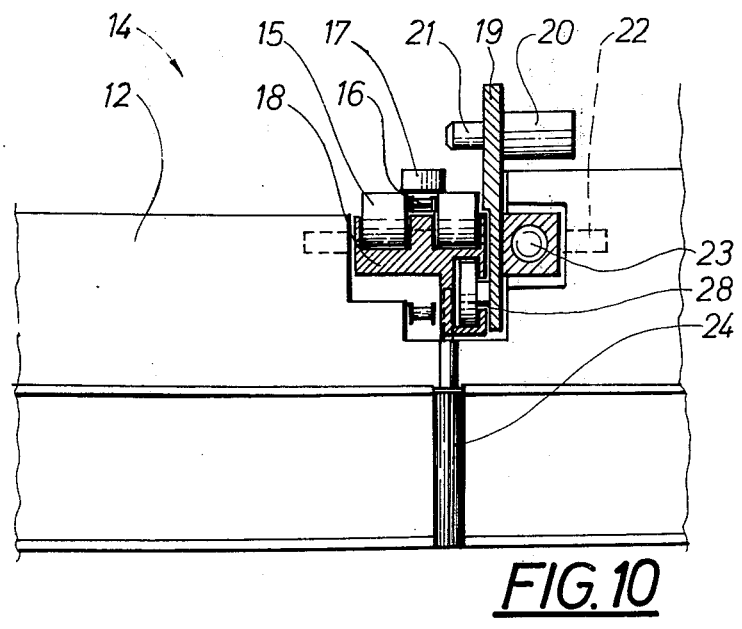

An embodiment of the invention is described in the following with reference to the accompanying drawings, in which FIG. 1 is a perspective view of high rise storage with a lifting truck belonging thereto, FIG. 2 is a top view of the storage and the truck, FIGS. 3-8 is a view seen in the way indicated by the line III—III of FIG. 2 and illustrating a mechanism of the truck and portions of the storage connected therewith, the different figures showing the mechanism in different working positions, FIG. 9 is a side elevational view of the truck, and FIG. 10 is a cross sectional view of the mechanism mentioned above along the line X—X of FIG. 3.

A storage establishment is evident from FIG. 1 exhibiting a number of supporting beams 1 arranged at several floor levels and intended for the support of the unit loads, containers or pallets with their corresponding load, in several rows above each other. The storage compartments formed by the beams 1 are arranged in double rows 2, which are accessible from the outside. As is evident from FIG. 2, transportation passages 3 with tracks for a lifting truck 5 are arranged between the rows 2. The track 4 has its terminal outside of the rows 2 and here deposit trestles 6, one for each double row 2, are arranged.

As is evident from the FIGS. 3-8, but not from the more schematic FIGS. 1 and 2, each one of the beams 1, which are shaped as tracks, supports a small carriage 7 provided with wheels, a supporting plane, and a control pin 8. The carriages 7 by means of a wire, not shown, biased by a weight or a spring tend to occupy the position illustrated in FIG. 3 close to the outer end of the beam 1 facing in direction towards the passage 3. However, stop dogs prevent the carriages 7 from passing out over the end of the respective beam 1.

As is evident from the FIG. 9 and also from the FIG. 1 the truck 3, displaceable on the track 4, exhibits two towers 9 connected with the bottom plate 10, provided with wheels 11. A lifting platform 12 is arranged above the bottom plate 10, said platform being arranged to be lifted by means of the lifting machineries 13 of the two towers. The lifting operation can be supervised from a controlling point. Each one of the ends of the lifting platform 12 supports the mechanism 14 illustrated in the FIGS. 3-8.

Figure 6:
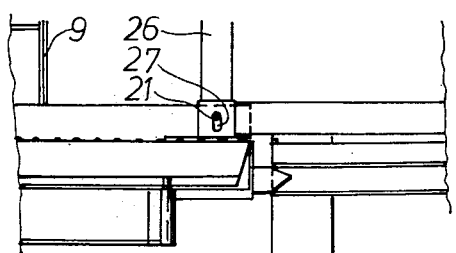
Figure 7:
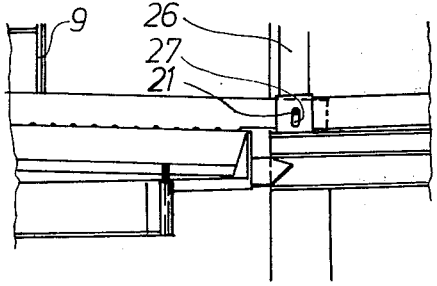
Figure 8:
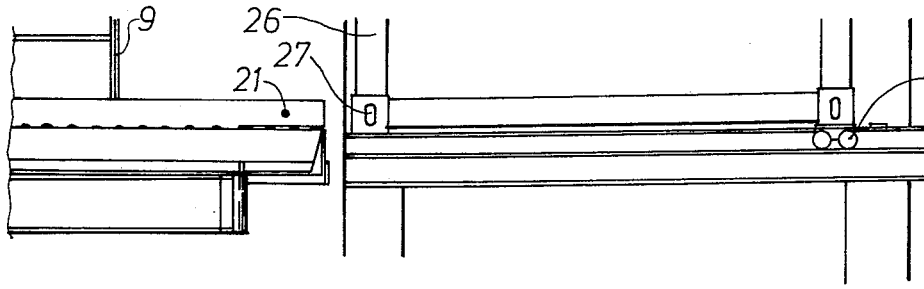

The two mechanisms 14 of the lifting platform 12 are facing each other in mirror fashion, and two roller conveyors 15 are facing each other (FIG. 10). In connection with the roller conveyors 15 there is a chain drive with a chain 16 arranged, said drive exhibiting two sprocket wheels located close to the outside edges of the lifting platform 12, two chain parts running between said wheels. The chain preferably supports two carrier dogs 17. The roller conveyor 15 and the chain 16 are supported by a frame 18, which in addition exhibits a gable 19. A power cylinder 20 which can be actuated by manual operation at a control panel or by means of well known position sensing switches is incorporated into the gable 19, by means of which cylinder a pin 21 can be controlled to move between the protruding position illustrated in FIG. 10 and a retracted position inside the gable 19. The frame 18, 19, as is evident from the figures 6 and 7, is tiltable, and for this purpose the frame at its center is journalled by means of a shaft 22 at the center of the lifting platform 12. In addition, the gable 19, which is displaceable relative to the frame portion 18, is also displaceable relative to the lifting platform 12 by means of a screw device 23 which can be rotated by an electric motor, preferably reversible and controlled from said panel by push buttons. The gable 19 can be selectively stopped and the movement resumed e.g. by means of well known sensing switches or the like. In order to produce a tilting over movement of the frame round the shaft 22, a power cylinder 24 is provided. Moreover, on the lifting platform 12 locating dogs 25 are provided, which can be made to project by means of power cylinders.

If the storage establishment shall be used as an in-between storage for example in connection with the unloading of a ship or as a collecting storage for unit loads brought to the storage by means of road or track transportation and intended to be forwarded by ship, the unit loads, containers, or pallets by means of trucks, hoists, or other transportation means are brought to the one of the trestles of deposit 6, which connects with the truck 3 servicing a row 2 of storage compartments intended for loading. The unit load is transferred from the deposit trestle 6 to the truck 3 in a way, which will be described later on, and said truck is brought to the vertical row of storage compartments, in which the compartment to be loaded is located. Thereafter, the lifting platform 12 is brought up to the intended level and is there locked by means of making the locating dogs 25 project. Hereby the working plane of the roller conveyor 15 is centered at the same level as the supporting plane of the carriage 7.

Figure 3:
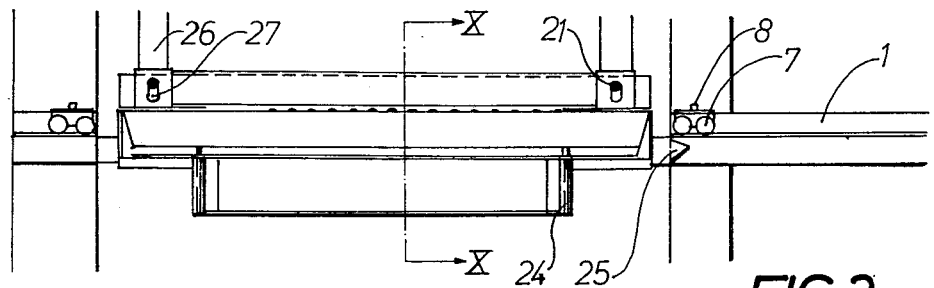
Figure 4:
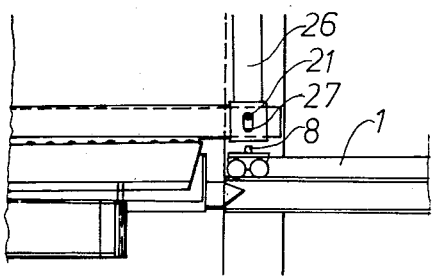
Figure 5:
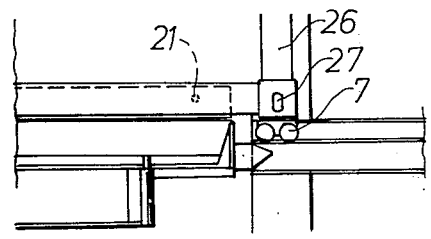

This starting position for the transfer of the unit load to the storage compartment is evident from the FIG. 3, in which the unit load (only partly shown) is indicated with 26, while holes made in the base portion of the same are indicated with 27. In the FIGS. 3–8 the transfer of the unit load 26 from the lifting platform to a storage compartment, in the figure located to the right of the truck, is shown in succession. As a first moment the pins 21 by means of the power cylinders 20 are brought into the position illustrated in FIG. 10, whereby they penetrate into the holes 27 of the container (FIG. 3). Thereafter the whole frame 18 (FIG. 10) and consequently the gable 19 is rocked in counter clockwise direction, and the gable 19 is displaced by means of the screw device 23 to the right, as is shown in FIG. 4, whereby it slides on rollers 28 in the frame 18. The projection does take place for so long a distance that holes corresponding the holes 27 of the underside of the container will arrive right in front of the pin 8 of the two carriages 7 standing at the extreme end of the beam 1. Now the frame 18 is again pivoted into a horizontal position, whereby the two outer corners of the unit load are deposited on the two carriages 7.

The carrier dogs 17 of the roller conveyors 15 have suitably been permitted to accompany the left corner of the unit load in connection with the projection mentioned and now stand in a position to move the unit load 26 further to the right. Said load now rolls with its right edge on the beams 1 by means of the carriages 7, while the left edge is supported by the roller conveyors 15 during the pushing action of the dogs 17 mentioned above. When the unit load has reached the position shown in the FIG. 6, thus with the holes 27 of the left edge right in front of the pins 21 of the gables 19, said pins are introduced into the holes, and during the continued movement to the right, during which the left edge of the unit load leaves the roller conveyor 15, the unit load is supported by means of the gables 19 via the pins 21. After the unit load has arrived in a position completely inside the respective beams 1, its left edge is deposited on these beams by a pivoting movement in clockwise direction of the frames 18, see FIG. 7. The pins 21 can now be disengaged and the gables withdrawn to normal position and the frames 18 returned to horizontal position, whereby the starting position again is reached.

The discharge of a storage compartment takes place in the same way as described, but with the moments in inverted order. Thus, the outer edge of the unit load is lifted first and is moved on to the roller conveyor by means of the gables 19. Thereafter, the carrier dog 17 is moved forwards and then strikes the inner edge of the frame of the unit load bringing the same on the roller conveyor. Finally the inner corner is lifted off from the pin 8 of the carriage 7 and is moved to a central position above the lifting platform 12 by means of the gables 19.

The deposit trestles 6 like the beams 1 are provided with carriages 7 and the loading/discharge does take place in the same manner as has been described in connection with the storage compartments.

By the arrangement according to the invention described a very easily accessible storage in several stories is obtained, taking up the smallest possible surface area without therefore any complicated and expensive arrangements having to be introduced in the storage installations themselves. The only arrangements required in addition to what is necessary in a totally unmechanized storage comprise the carriages 7 with their putting-back arrangements, thus, robust, reliable, and not very expensive arrangements. In spite thereof the invention has made it possible to avoid greater lateral load moments on the device by means of which the unit loads are introduced into and discharged from the storage establishment. This is reached by the truck device substantially only being subjected to gravity loads the resultant forces of which being within the accommodation surface of the truck, which surface has been given as small width as possible, i.e. the width of a passage adapted for the introduction of the unit loads between the storage compartments. It is further pointed out that the arrangement according to the invention is adapted to both containers and pallets. The latter ones can namely not be loaded with any unit loads on top of them and therefore can neither be stored nor be lifted like containers in the form of a pile. This limits the possibilities of solution in connection with storage and handling arrangements as compared with rigid container.

It shall finally be mentioned that the transportation and lifting means, which has been indicated in the present description and drawings as a trackbound trucking means, can be substituted by another transportation means within the scope of the invention. Among such means one can mention not trackbound trucks, which are suitable for storages not very frequently used, as such a truck with respect to its movements is not limited to any defined section of the storage establishment. Such an independent truck can also be brought directly to for example an unloading site. Alternatively the trucking means mentioned in the description can be substituted by a travelling crane with a wire suspended lifting platform.

I claim:

1. Arrangement in connection with storage establishments for unit loads comprising a number of storage compartments for reception of the unit loads and at least one transportation device arranged to service the storage compartments, said transportation device being movable along the storage compartments and having a platform movable between different levels and provided with first supporting means arranged to support the unit loads, said device further having sidewardly pushing means mounted on said platform and arranged to transfer the unit loads respectively into their storage compartments and vice versa, said storage compartments including second supporting means having sliding devices arranged to receive one edge of the unit load respectively at the side of the storage compartment from which the unit load is intended to be introduced by means of the transportion device and carry said edge during the introduction of the unit load into the storage compartment respectively, said transportation device including means to support and displace a second edge of the unit load within a range of the transportation device which substantially occupies a position outside of the storage compartments, said transportation device including further means for the transfer of the last mentioned edge of the unit load from said range within the main part of the transportation device to the outside edge of the storage compartment and vice versa, means on said platform with said supporting means of said transportation device being pivotable around a common axis, substantially horizontally and transversely arranged in relation to the sidewardly pushing means, enabling the unit load to be tilted and one of said edges to be tilted upwardly upon sidewardly displacement of same to and from a position above said sliding devices, and upon lifting from said sliding devices to be brought down onto the sliding devices by tilting downwardly.

2. Arrangement in connection with storage establishments for unit loads comprising a number of storage compartments having supporting means for the unit loads and at least one transportation device servicing the storage compartments and arranged to bring the unit loads to the respective storage compartments and introduce them into the same and vice versa, said supporting means having a sliding device arranged to receive an edge of the unit load at that side of the storage compartment from which the unit load is intended to be introduced by means of the transportation device and support said edge during the introduction of the unit load into the compartment, said transportation device comprising a platform, elevator means for vertically displacing said platform, tiltable frames at both ends of said platform journalled around substantially horizontal shafts which extend at substantially right angles to the intended direction of movement of the unit loads into and out of the storage compartments, transfer means for transferring the juxtapositioned edge of the unit load to said sliding device when the transportation device has been moved to a position near to the compartment, transportation means for the support and displacement of the other edge of the unit load within the range of the transportation device, which substantially occupies a position ouside of the compartment and additional means for the transfer of the last mentioned edge of the unit load from said range within the main part of the transportation device to the outside edge of the storage compartment and vice versa, said transfer means comprising an engaging member having a range of displacement movement limited to the range inside the main part of the transportation device and a point outside of the same near to the storage compartment and arranged to engage said edge of the unit load lifting up and displacing the same, said transportation means comprising a conveyor on each frame, and said transfer means further comprises a gable member displaceably arranged in each frame, so that when the unit load is held by said engaging member it can be lifted with one edge by tilting the frame around the shaft and with its edge be moved between a position inside the main part of the transportation device and a position above the sliding device of the storage compartment by means of the displacement of the gable member, while the principle movement of displacement in and out of the storage compartment is provided by means of the conveyor during disengagement of the engaging member, during which operation the unit load is supported by the conveyor and the sliding device of the storage compartment.

* * * * *